(12) United States Patent
Trescott (10) Patent No.: US 7,617,800 B2
(45) Date of Patent: Nov. 17, 2009

(54) ANIMAL RESTRAINING APPARATUS AND PROTECTIVE DEVICE

(76) Inventor: Sara Lou Trescott, P.O. Box 22, Woodbine, MD (US) 21797

( * ) Notice: Subject to any disclaimer, the term of this patent is extended or adjusted under 35 U.S.C. 154(b) by 306 days.

(21) Appl. No.: 11/724,998

(22) Filed: Mar. 16, 2007

(65) Prior Publication Data

US 2008/0223312 A1    Sep. 18, 2008

(51) Int. Cl.
   *A01K 15/04*    (2006.01)
   *A01K 27/00*    (2006.01)
(52) U.S. Cl. ..................... 119/815; 119/850
(58) Field of Classification Search ............. 119/815, 119/850, 814, 837; D30/144, 152
   See application file for complete search history.

(56) References Cited

U.S. PATENT DOCUMENTS

| | | | |
|---|---|---|---|
| 2,832,406 A * | 4/1958 | Turenne | 160/179 |
| 3,013,530 A * | 12/1961 | Zeman | 119/815 |
| 3,036,554 A * | 5/1962 | Johnson | 119/821 |
| 3,072,098 A * | 1/1963 | Boemle | 119/821 |
| 3,153,399 A * | 10/1964 | Koon | 119/729 |
| 3,387,588 A * | 6/1968 | Bird | 119/760 |
| 3,540,417 A * | 11/1970 | Reed | 119/760 |
| 4,200,057 A * | 4/1980 | Agar | 424/9.8 |
| 4,350,198 A * | 9/1982 | Naegeli | 160/179 |
| 4,413,588 A * | 11/1983 | Lindholm | 119/760 |
| 4,476,814 A * | 10/1984 | Miller | 119/821 |
| 4,938,169 A * | 7/1990 | Barmakian | 119/622 |
| 4,977,857 A | 12/1990 | Slawinski | |
| 5,133,295 A * | 7/1992 | Lippincott | 119/821 |
| D343,366 S * | 1/1994 | Dreher | D10/104 |
| 5,349,927 A * | 9/1994 | Campbell | 119/815 |
| 5,755,186 A | 5/1998 | Mandeville | |
| 5,797,354 A * | 8/1998 | Marschall | 119/815 |
| 6,044,802 A * | 4/2000 | Schmid et al. | 119/856 |
| 6,338,315 B1 * | 1/2002 | Stillman | 119/51.01 |
| 6,463,887 B1 * | 10/2002 | Thomas | 119/850 |
| 6,557,497 B1 | 5/2003 | Milligan | |
| 6,659,046 B2 * | 12/2003 | Schmid et al. | 119/815 |
| D506,296 S * | 6/2005 | Driver | D30/152 |
| 6,925,966 B1 * | 8/2005 | Wexler | 119/850 |

* cited by examiner

*Primary Examiner*—Yvonne R. Abbott
(74) *Attorney, Agent, or Firm*—Konstantina M. Katcheves; Saul Ewing LLP (57) ABSTRACT

An animal restraining shield comprising a planar sheet having a vertical edge and a horizontal edge and an aperture in the planar sheet sized to permit a head of an animal to pass through the aperture, wherein the animal restraining shield is adapted to limit motion of one or more limbs of the animal and wherein the vertical edge extends a downward distance from the aperture comprising at least a full length of a forelimb of the animal as measured from the head of the animal to a foot of the animal.

26 Claims, 9 Drawing Sheets

ANIMAL RESTRAINING APPARATUS AND PROTECTIVE DEVICE

BACKGROUND

1. Field of the Invention

The embodiments of the invention generally relate to a restraint apparatus for animals, and, more particularly, to an animal restraining apparatus and protective device specifically placed over an animal's head as a shield or garment restraining movement of an animal during treatment or medicating procedures particularly involving the animal's head and/or neck area.

2. Description of the Related Art

In the handling of animals, it is often necessary to restrain an animal for the efficient and safe medication and/or treatment of the animal. It is often necessary to restrain an animal for treatment and medication purposes in veterinary, domestic or any other setting where animals may be present. Such an apparatus provides the ability for a handler to medicate or treat the head area of an animal yet use the minimal amount of restraint. Generally, the least amount of restraint that is needed should be applied to the animal. The more a handler attempts to restrain an animal, generally the animal becomes more resistant and defiant to the restraint and the procedure. Excessive amounts of restraint result in combative, aggressive, agitated and defiant animals; thus creating a situation dangerous for both the animal and handler. An agitated and combative animal may often harm the handler.

As are known in the art, restraint bags can be used to restrain or immobilize small animals such as cats as well as small dogs. The bags are generally made of canvas or nylon or other durable fabric, with a hook or other type of fastener at the neck opening and one or more zippers, strips of Velcro, or other fasteners at various locations on the bag to allow selective exposure of a body part. Instead of a restraint bag, another immobilization technique employs the use of a heavy towel or a pillow case can be used to wrap the animal's body, leaving the head exposed.

Although effective, use of devices such as pet bags present a challenge to the handler (e.g. owner, veterinary worker, caretaker, etc. for example) attempting to treat the animal. Generally, animals become very agitated and combative when such extreme restraint is used; thus, making it difficult for the handler to place the animal in a device such as a restraint bag.

For some animals, a hood or muzzle may also be used to aid in treatment. The muzzle covers and surrounds the animal's mouth and nose area which limits the animal's ability to bite at the handler. Hoods are similar to muzzles and cover the end of the animal's face and eyes. Although effective for their purposes of limiting the biting ability of an animal, these devices do not allow for the effective oral administration of medication to the animal.

U.S. Pat. No. 5,755,186, incorporated herein by reference, discloses a bird predation deterrent shield which can be suspended from the anterior neck region of a cat.

U.S. Pat. No. 5,349,927, incorporated herein by reference, discloses a protective collar comprising a flat sheet bent to form a conical surface.

U.S. Pat. No. 5,133,295, incorporate herein by reference, discloses a protective collar made of soft and flexible medical padding sewn together.

U.S. Pat. No. 4,977,857, incorporate herein by reference, discloses a flexible pet carrier bag with an opening or aperture for the exposure of only the head of a small pet.

SUMMARY

In view of the foregoing, an embodiment of the invention provides an animal restraining shield comprising a substantially rectangular planar sheet having a top edge and a bottom edge and an aperture having a perimeter (e.g. circumference) in the planar sheet sized to permit a head of an animal to pass through from a back side to a front side of the aperture. The animal restraining shield is adapted to limit a motion of one or more limbs of the animal. Moreover, the distance measured from the perimeter (e.g. circumference) to the bottom edge is at least a full length of a forelimb of the animal as measured from the head of the animal to a foot of the animal.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The present invention provides an animal restraining shield comprising a substantially rectangular planar sheet (the sheet may also comprise various shapes as are envisioned in the art) having a top edge and a bottom edge and an aperture (e.g. hole, puncture or other opening) having a perimeter (e.g. circumference) in the planar sheet sized to permit a head of an animal to pass through from a back side to a front side of the aperture. The animal restraining shield is adapted to limit a motion of one or more limbs of the animal. The motion that is limited by the apparatus of the invention includes but is not limited to lateral, forward and overhead motion, for example, specifically of an animal's forelimbs.

The animal restraining shield of the present invention is designed to prevent movements of an animal including swiping action of forelimbs as well as forward mobility of an animal when attempting to engage in actions such as such as walking; thereby limiting full mobility of some or all the limbs of the animal. The restraining shield further comprises a distance measured from the bottom edge of the perimeter of the aperture (e.g. bottom of a circumference) of the aperture to the bottom edge that comprises at least a full length of a forelimb of the animal as measured from the head of the animal to a foot of the animal. The distance measured from the circumference of the aperture to the bottom edge may be adapted to fit various sized animals. The invention may be used on domestic animals, including but not limited to cats and dogs as well as such animals as may be found on farms, ranches, zoos or the wild, for example.

In another embodiment of the invention, the planar sheet extends an upward predetermined distance beyond the circumference where the distance is measured from the head of the animal. The upward distance is adapted to prevent overhead swiping motions of an animal's limbs. Thus, the upward distance extends at least up to the top of the head of the animal. This embodiment prevents possible harm to a handler during treatment or care of an animal. The top of edge width and bottom edge width of the present invention are at least equal to or greater than a shoulder width of the animal.

In yet another embodiment of the invention, the bottom edge of the animal restraining shield is angled (e.g. bent, twisted, curved, etc.) toward the forelimb of the animal such that the animal will step into the angled portion of the device thus further restraining movement and mobility of the animal and/or limbs of the animal. In other embodiments of the invention, the shield may also be angled away from the animal. Moreover, the embodiment may also comprise a distance measured from the circumference of the aperture to the bottom edge of the planer sheet that is greater than a full length of a forelimb of the animal as measured from the head of the animal to a foot of the animal.

In yet another embodiment of the invention, the planar sheet further comprises a plurality of notches (e.g. tabs, cuts, gash, score, etc.) which may be perforated or cut through or partially cut into the planar sheet extending from the circumference in at least one direction from a center of the aperture. The notches may be positioned radially or not radially from a center point of the aperture. The invention may further comprise at least one perforated notch connected to an edge of the planar sheet adapted to permit ease of removal of said shield from said animal. The perforated notch may be pulled such that a strip of the planar sheet material is removed to allow for quick release of the shield from around the neck of the animal.

For example, a strip of material is removed from the planar sheet such that the shield may be pulled away from the neck of the animal without pulling the head of the animal back through the aperture. The notch or notches connected to an edge may be pulled by animal handler thereby releasing the animal from the device quickly and efficiently limiting any struggle to remove the apparatus from a possibly agitated animal.

In yet another embodiment, the apparatus may have any other closures as are known in the art to position the apparatus around the head of the head of said animal and ease in removal after handling of the animal. Such closures may include Velcro®, buttons, snaps, adhesive or others as are known in the art to allow for placement and removal of the apparatus of the invention on the animal.

In another embodiment the animal restraining shield comprises at least one of a semi-rigid material and a rigid material. The material may be plastic, (e.g. polyvinyl chloride, nylon or other semi-rigid or rigid plastic polymers as are known in the art including inorganic and organic plastic polymers). The material may be a rigid or semi rigid paper product such as cardboard. The shield may also be a thin metal sheet for reusability and sterility as well. These examples of rigid and semi-rigid materials are in no way limiting and other such materials as are known in the art to make the apparatus of the present invention. Moreover, the material may be produced from clinically sterile material or sterilized after production using such means as are known in the art including but not limited to steam, heat, chemical, radiation and any other sterilization methods as are known in the art. The apparatus may further be package into a veterinary product by providing for the apparatus of the invention sterilized and placed within a sealed plastic or other sterile envelop or enclosure to prevent or inhibit contamination of the apparatus for veterinary uses.

In yet another embodiment, the method of the present invention further allows for an aperture, having a perimeter (e.g. circumference), positioned adjacent the top edge of the shield, where the aperture is sized larger than a neck of the animal and smaller than a head of the animal adapted to prevent the animal from removing its head from the aperture (i.e. pulling its head out of the aperture). Because the aperture is smaller than the head of the animal, it may comprise a plurality of notches, as are described herein, extending from the perimeter (e.g. circumference) in at least one direction. The notched aperture allows for the head of the animal to push through from the back of the device to the front of the device. Because the aperture is smaller than the head of the animal, other means for closure of the device around the neck of the animal may be used including but not limited to Velcro®, buttons, snaps, adhesive or others as are known in the art to allow for removal of the apparatus of the invention on an animal. Additionally, as described herein, this embodiment may further comprise at least one perforated notch connected to an edge of the planar sheet adapted to permit ease of removal of said shield from said animal. The perforated notch may be pulled such that a strip of the planar sheet material is removed to allow for quick release of the shield from around the neck of the animal. For example, a strip of material is removed from the planar sheet such that the shield may be pulled away from the neck of the animal without pulling the head of the animal back through the aperture. The notch or notches connected to an edge may be pulled by animal handler thereby releasing the animal from the device quickly and efficiently limiting any struggle to remove the apparatus from a possibly agitated animal.

In an alternate embodiment, the invention of the present invention the planar sheet may be angled over the back of the animal and under the legs of the in such a way as to surround the animal. Thus, the planar sheet is substantially conical in shape having a small opening and a large opening at each end. The small opening comprises notches as are more particularly described herein including but not limited to notches, tabs, cuts, gash, score, etc and others as are known in the art; and a means for removal and positioning as are more particularly described herein including other means for closure of the device around the neck of the animal may be used including but not limited to Velcro®, buttons, snaps, adhesive or others as are known in the art to allow for removal from or position of the apparatus of the invention on an animal. The animal is positioned with its head through the small opening with the large opening toward the anterior to the animal's head. This embodiment proves useful in the handling and manipulating of including but not limited to small animals such as rats, mice, ferrets, etc. for example. It allows the handler, the hold the planar sheet which surrounds the animal to limit the animal's mobility and scratching ability without concern for injury to the handler from the animal.

Such an apparatus provides the ability for a handler to medicate or treat the head area of an animal yet use the minimal amount of restraint. Generally, the least amount of restraint that is needed should be applied to the animal. The more a handler attempts to restrain an animal, generally the animal becomes more resistant and defiant to the restraint and the procedure. Excessive amounts of restraint result in combative, aggressive, agitated and defiant animals; thus creating a situation dangerous for both the animal and handler.

Referring now to the drawings, and more particularly to FIGS. 1 through 6, where reference characters denote corresponding features consistently throughout the figures, there is shown preferred embodiments of the invention.

Figure 1:
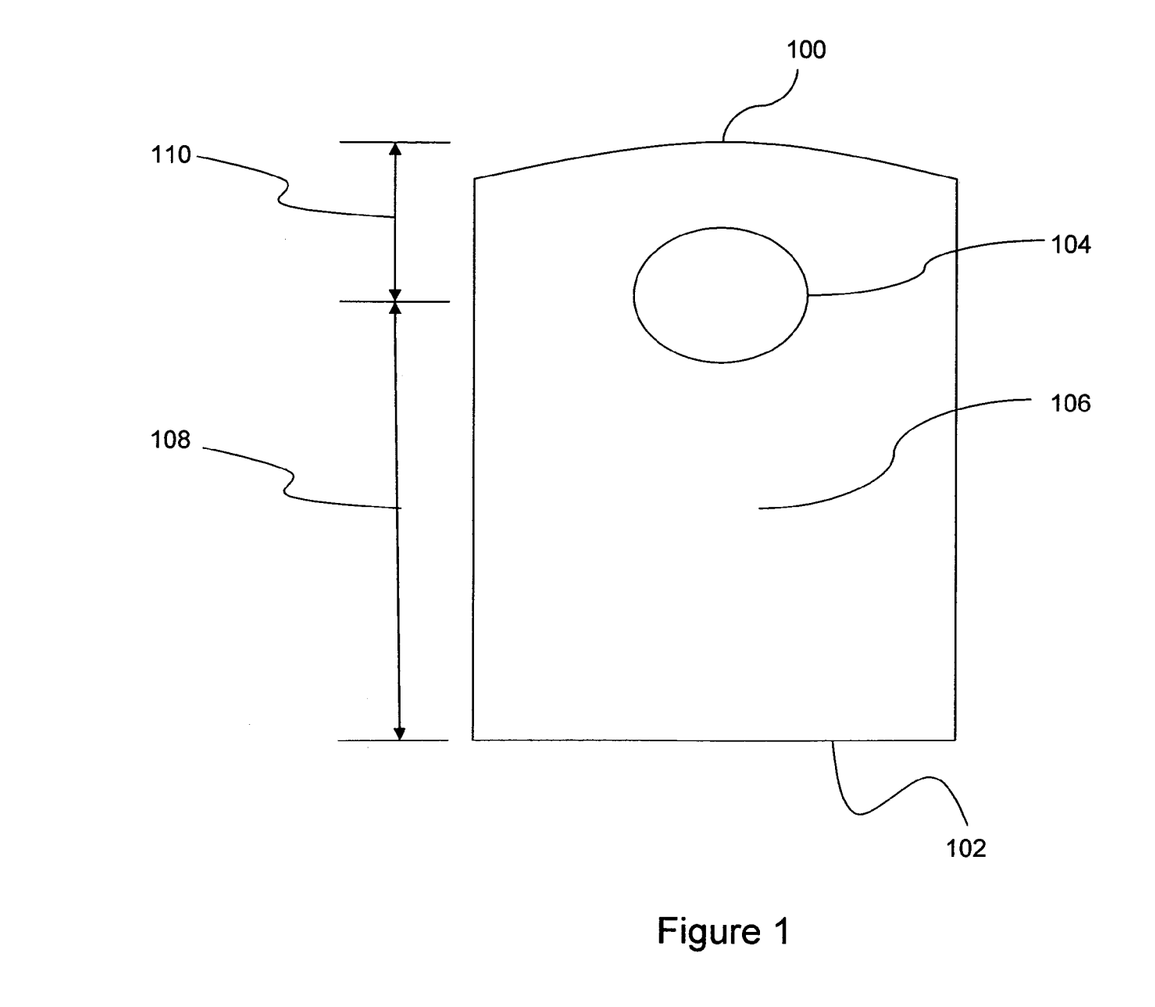
FIG. 1 illustrates a schematic diagram of the pet restraining apparatus of the present invention.

FIG. 1 illustrates a schematic diagram according to an embodiment of the invention of an animal restraining shield comprising a substantially rectangular planar sheet (106) having a top edge (100) and a bottom edge (102) and an aperture having a perimeter (e.g. circumference) (104) in the planar sheet (106) sized to permit a head of an animal to pass through from a back side to a front side of the aperture, wherein the animal restraining shield adapted to limit a motion of one or more limbs of the animal and wherein a distance (108) measured from the circumference to the bottom edge is at least a full length of a forelimb of the animal as measured from the head of the animal to a foot of the animal.

The planar sheet further extends an upward predetermined distance (110) beyond the aperture a distance measured from the head of the animal adapted to prevent overhead motion of the limbs of the animal (e.g. prevent scratching or grabbing of a handler).

Figure 2:
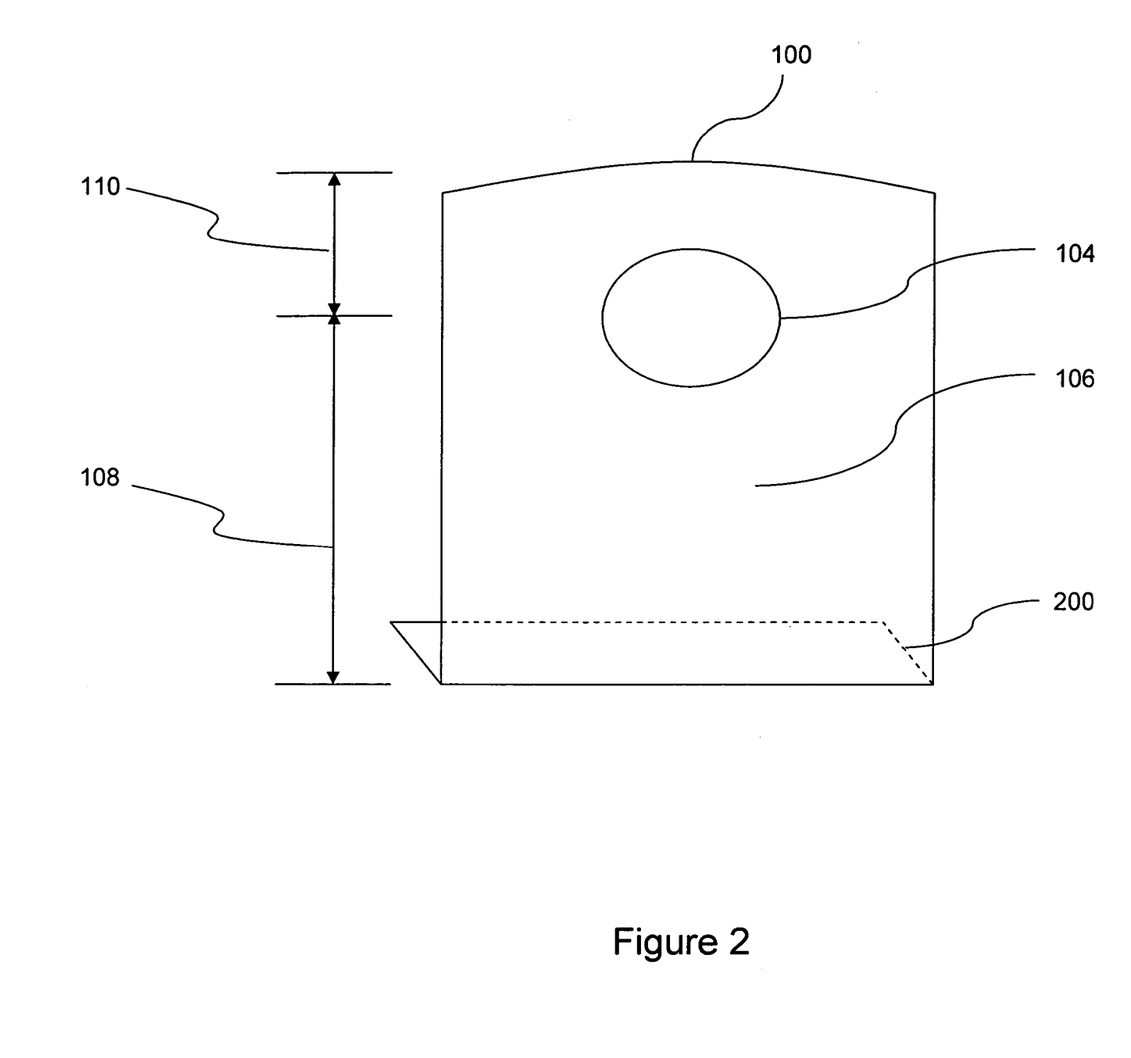
FIG. 2 illustrates a schematic diagram of another embodiment of the pet restraining apparatus depicting a feature wherein the apparatus is angled toward the animal.

FIG. 2 illustrates a schematic diagram showing the feature wherein the bottom edge comprises a bend or angle (200) toward the animal thereby preventing mobility of the forelimbs of the animal including limiting mobility such as walking of the animal.

Figure 3:
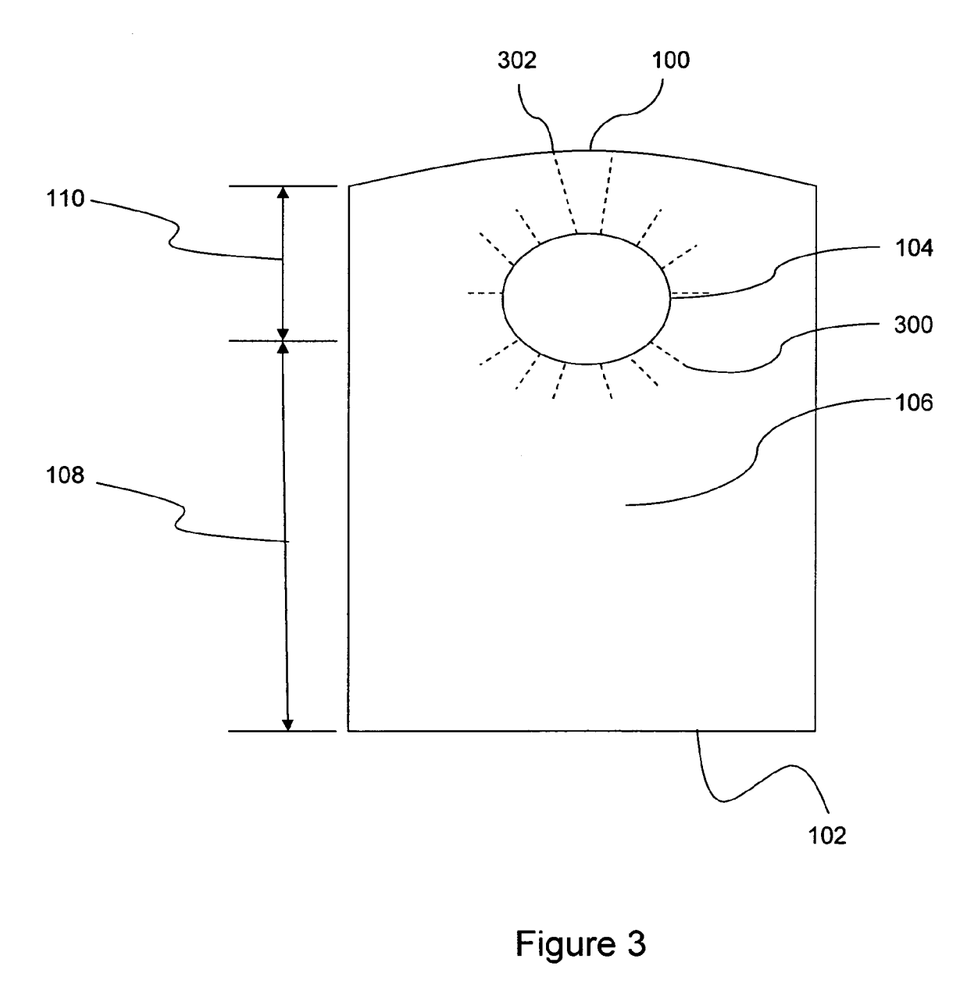
FIG. 3 illustrates a schematic diagram of yet another embodiment of the invention wherein the aperture also comprises notched perforations.

FIG. 3 illustrates a schematic diagram showing a plurality of notches (300) extending outward from the aperture. The notches may or may not extend radially outward from the aperture. Item (302) shows at least one notch connected to an edge of the planar sheet adapted to permit ease of removal of the shield from the animal, wherein the edge is select from the top edge of the shield, said bottom edge and a vertical edge (304).

Figure 4:
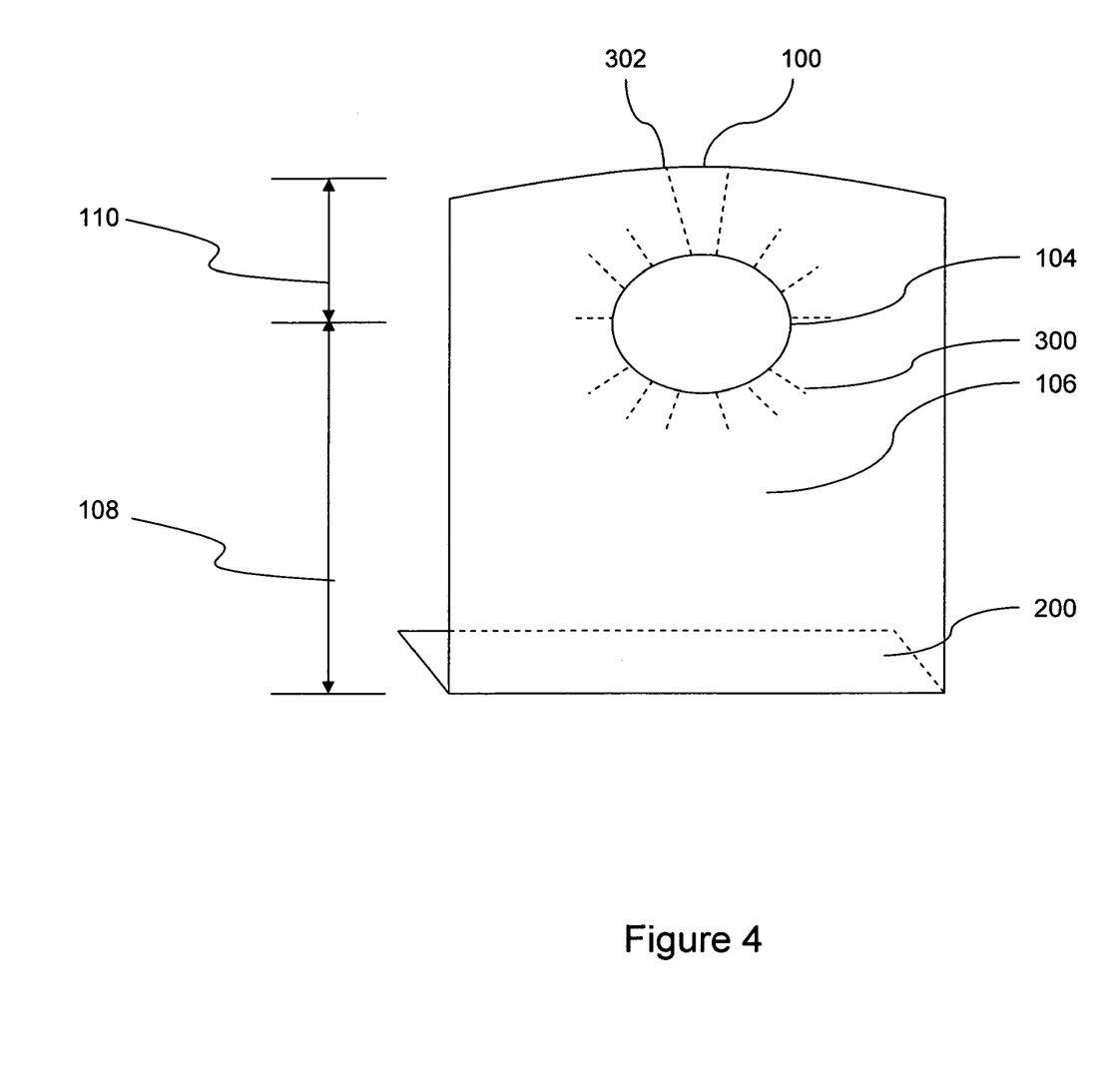
FIG. 4 illustrates a schematic diagram of another embodiment of the embodiment where the invention comprises notched perforations and is angled.

FIG. 4 illustrates a schematic diagram showing the feature wherein the bottom edge comprises an angle (200) (e.g. bend, corner, etc.) toward the animal thereby preventing mobility of the forelimbs of the animal including limiting mobility such as walking of the animal.

Figure 5A:
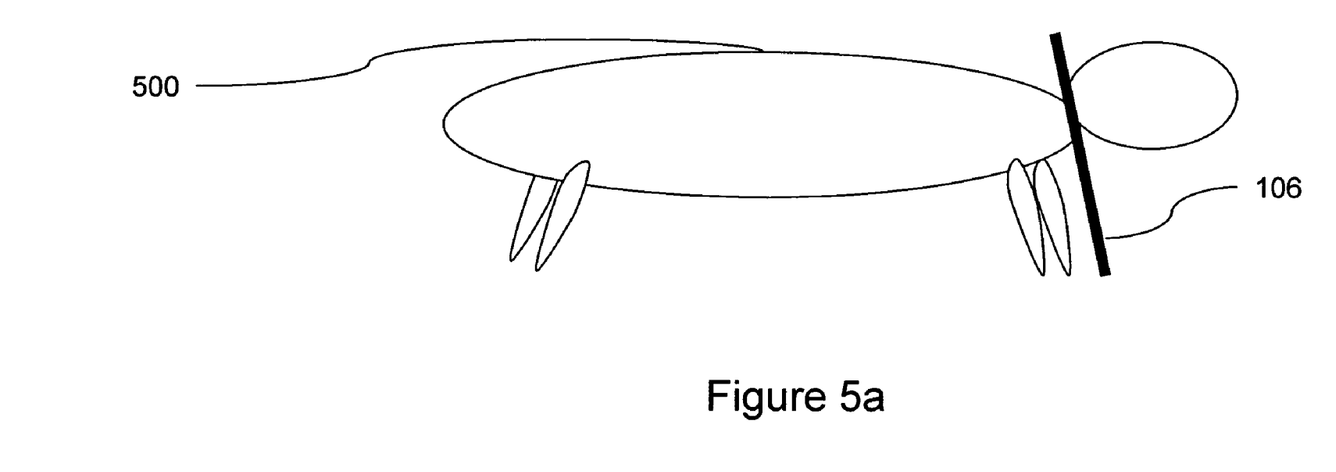
FIG. 5a and FIG. 5b illustrate side views of the embodiments of the invention.
Figure 5B:
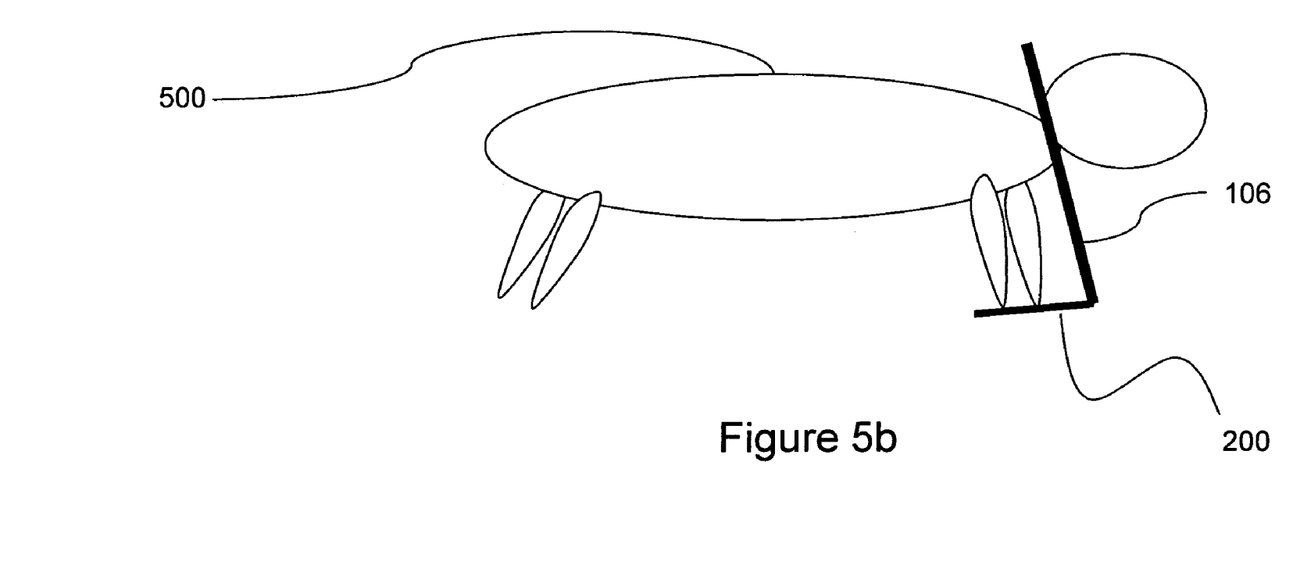

FIGS. 5a and 5b illustrate side views of the embodiments of the invention including the positioning of the animal (500) in relation to the restraining shield.

Figure 6:
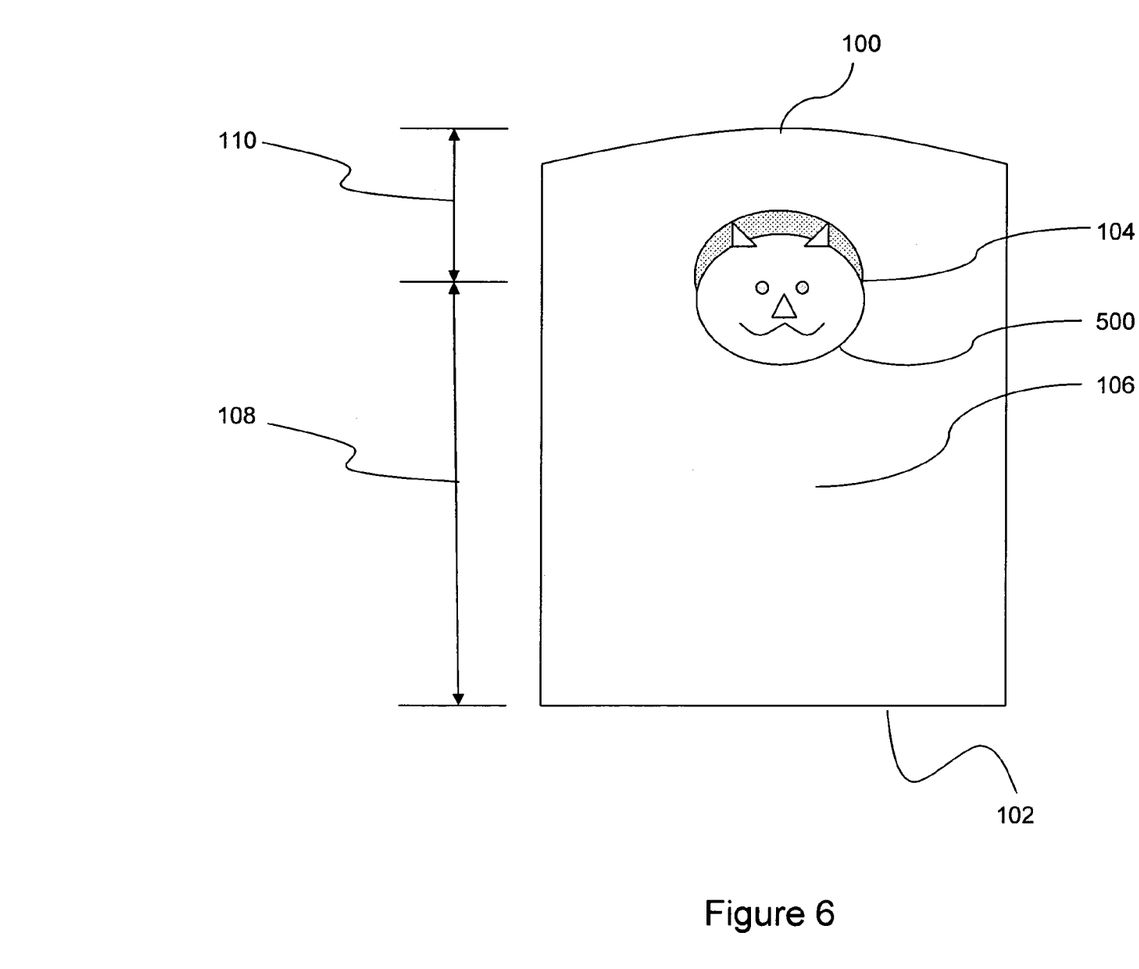
FIG. 6 generically illustrates a front view of the present invention with an animal's head positioned through the aperture.

FIG. 6 generically illustrates a front view of the present invention with an animal's head positioned through the aperture and those features described in FIG. 1, herein above.

Figure 7:
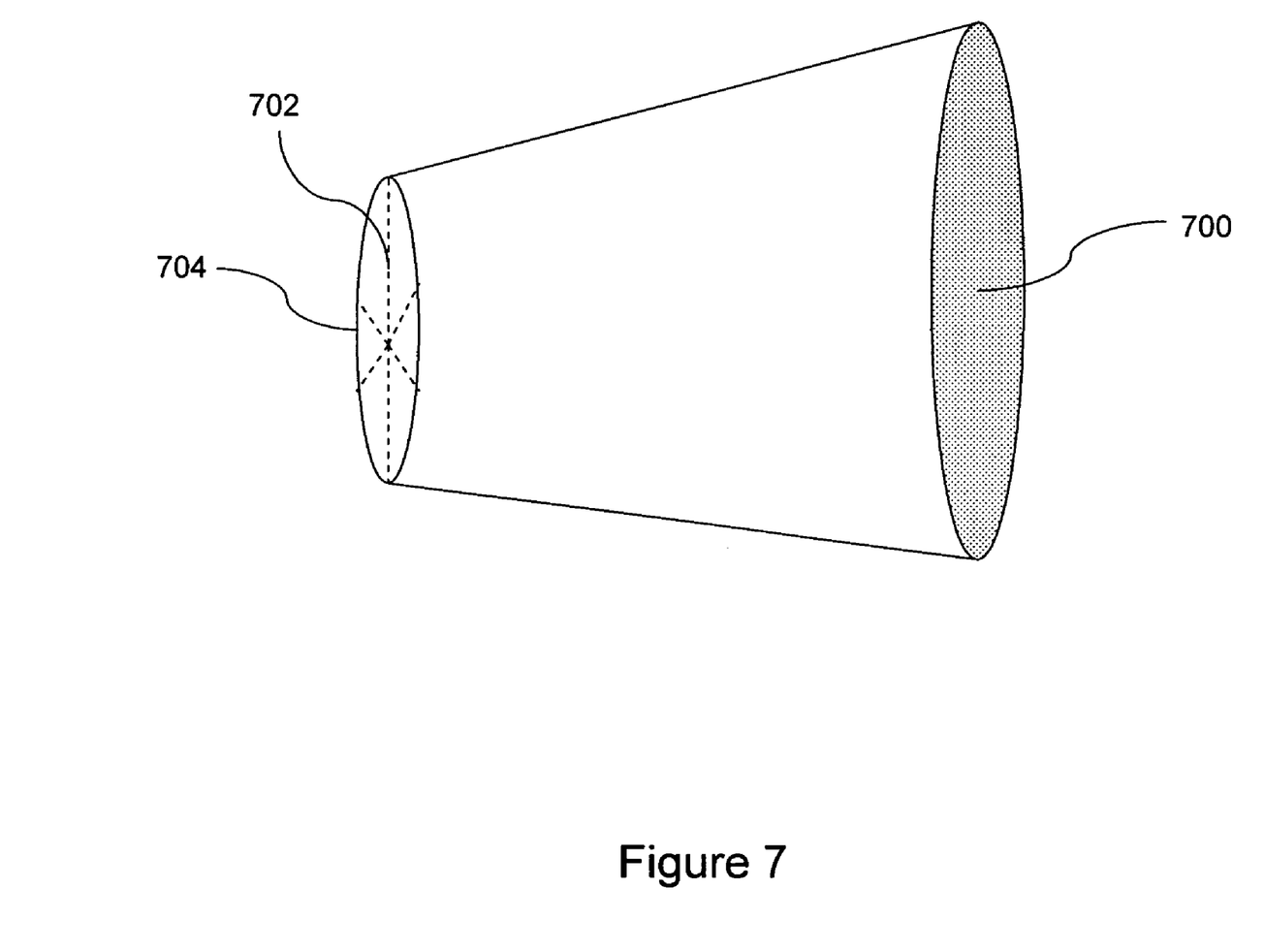
FIG. 7 illustrates a schematic diagram of an alternate embodiment of the invention.
Figure 8:
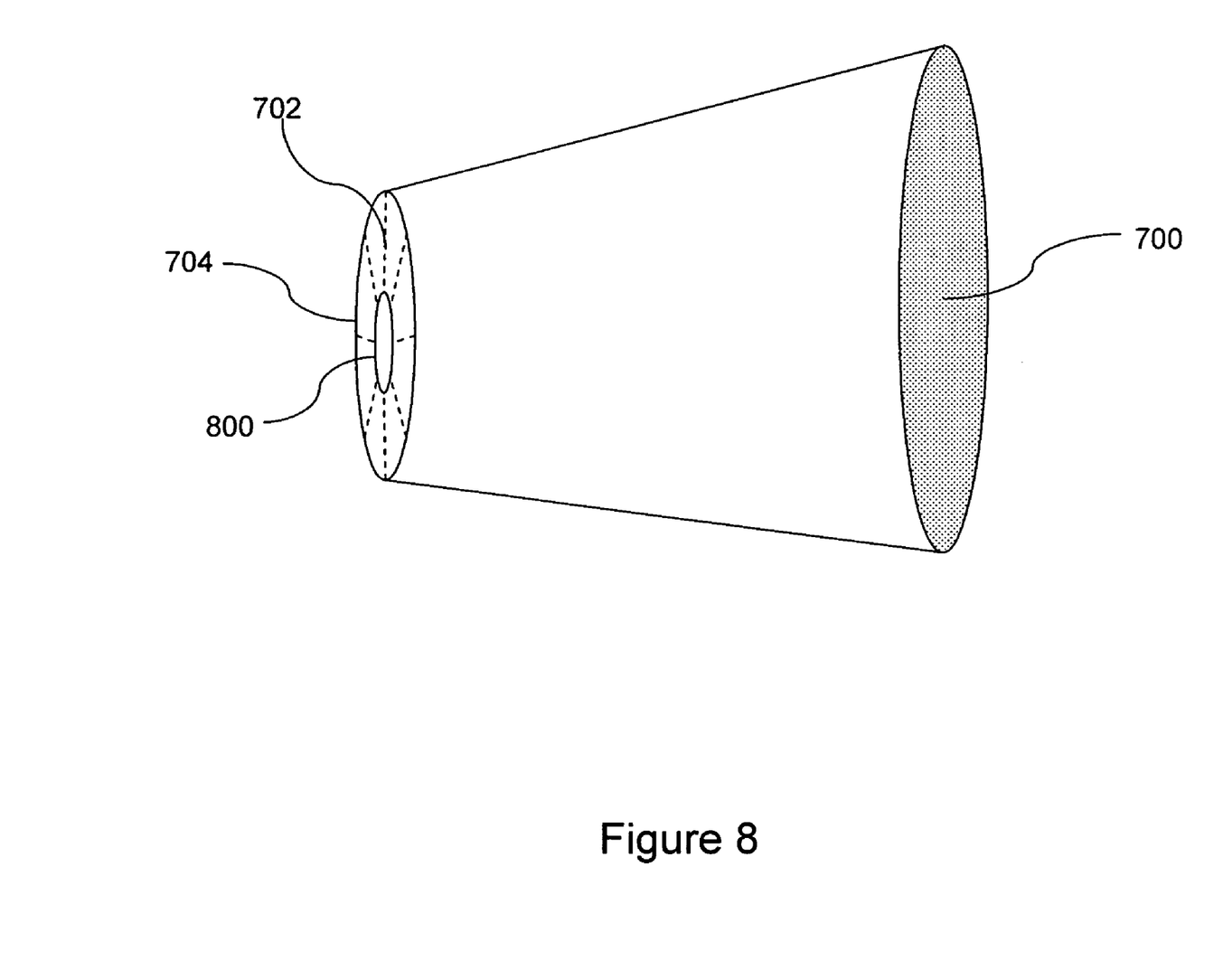
FIG. 8 further illustrates a schematic diagram of an alternate of the invention.
Figure 9:
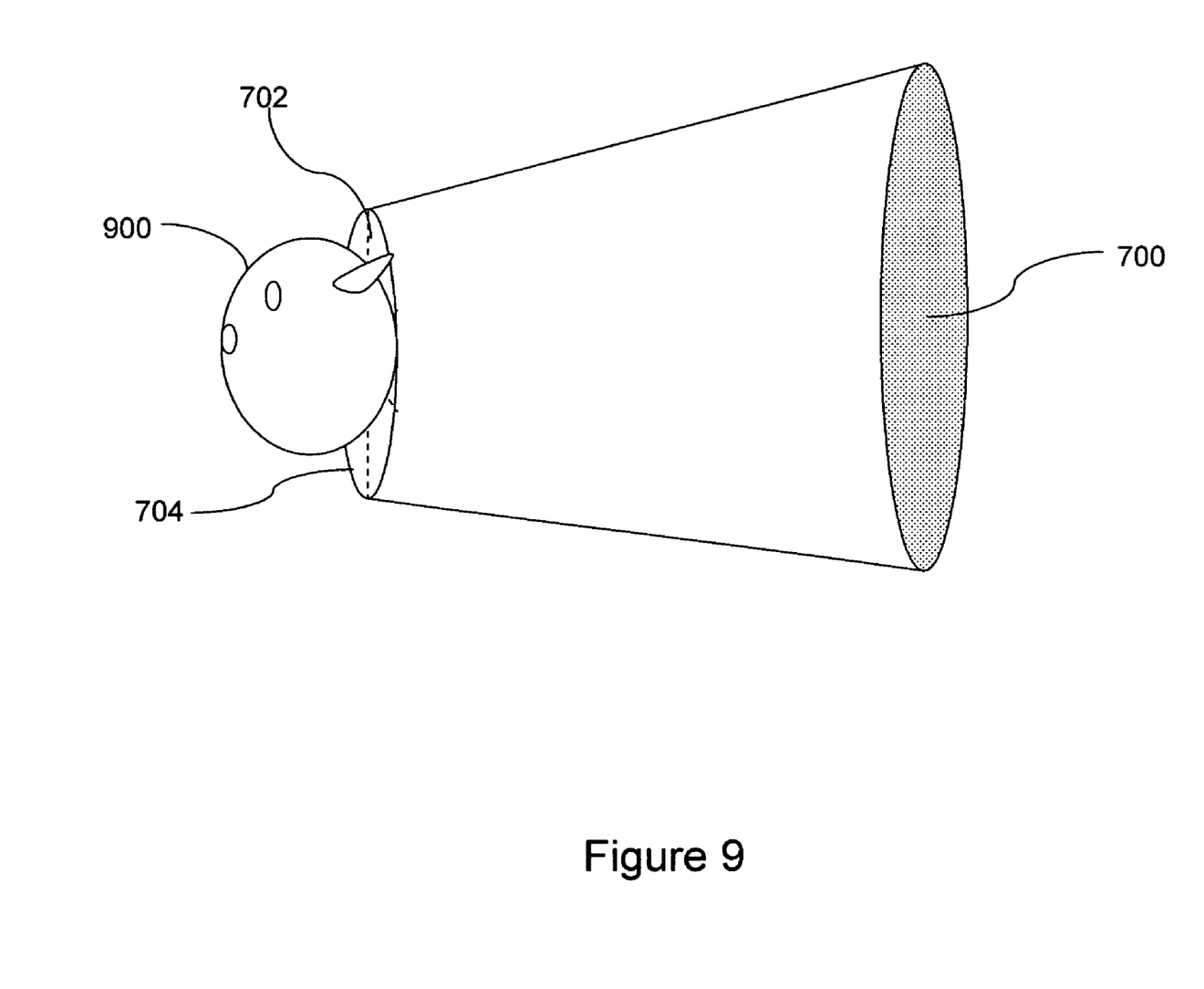
FIG. 9 illustrates a schematic diagram showing a view of an alternate embodiment of the invention showing the positioning of an animal in relation to the embodiment.

FIGS. 7, 8 and 9 are schematic diagrams showing an alternate embodiment, the invention of the present invention wherein the planar sheet may be angled over the back of the animal and under the legs of the in such a way as to surround the animal. Thus, the planar sheet is substantially conical in shape having a small opening (704) and a large opening (700) at each end. The small opening comprises notches (702) as are more particularly described herein including but not limited to notches, tabs, cuts, gash, score, etc and others as are known in the art; and a means for removal and positioning as are more particularly described herein including other means for closure of the device around the neck of the animal may be used including but not limited to Velcro®, buttons, snaps, adhesive or others as are known in the art to allow for removal from or position of the apparatus of the invention on an animal. FIG. 8 shows an alternate embodiment wherein the small opening further comprises an aperture (800). FIG. 9 shows the animal (900) positioned with its head through the small opening (704) with the large opening (700) anterior to the animal's head. This embodiment proves useful in the handling and manipulating of including but not limited to small animals such as rats, mice, ferrets, etc. for example. It allows the handler, the hold the planar sheet which surrounds the animal to limit the animal's mobility and scratching ability without concern for injury to the handler from the animal.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

The invention claimed is:

1. An animal restraining shield comprising
   a substantially rectangular planar sheet having a top edge and a bottom edge, and said bottom edge is angled toward or away from said forelimb of said animal, and
   an aperture having a perimeter in said planar sheet sized to permit a head of an animal to pass through from a back side to a front side of said aperture,
   wherein said animal restraining shield adapted to limit a motion of one or more limbs of said animal and wherein a distance measured from said perimeter to said bottom edge is at least a full length of a forelimb of said animal as measured from said head of said animal to a foot of said animal.

2. The animal restraining shield according to claim 1, wherein said planar sheet extends an upward predetermined distance beyond said perimeter a distance measured from said head of said animal.

3. The animal restraining shield according to claim 1, wherein said motion further comprises at least one of a forward motion of said forelimb and a lateral motion of said forelimb.

4. The animal restraining shield according to claim 1, wherein said planar sheet further comprises a plurality of notches extending from said perimeter in at least one direction from a center of said aperture.

5. The animal restraining shield according to claim 4, wherein at least one said notch is a perforated notch, connected to an edge of said planar sheet, wherein a portion of said planar sheet is removed.

6. The animal restraining shield according to claim 1, wherein said planar sheet comprises at least one of a semi-rigid material and a rigid material.

7. The animal restraining shield according to claim 1, wherein said top edge width is equal to or greater than a shoulder width of said animal.

8. The animal restraining shield according to claim 1, wherein said animal restraining shield further comprises a clinically sterile material.

9. The animal restraining shield according to claim 1, wherein said motion further comprises at least one of a forward motion of said forelimb and a lateral motion of said forelimb.

10. An animal restraining shield comprising
a planar sheet comprising a top edge and a bottom edge,
said bottom edge is angled toward or away from said forelimb of said animal,
an aperture, having a perimeter, positioned adjacent said top edge, said aperture sized larger than a neck of said animal and smaller than a head of said animal adapted to prevent said animal from removing said head from said aperture, and
a plurality of notches extending from said perimeter in at least one direction,
wherein said animal restraining shield is adapted to limit a motion of one or more forelimbs of said animal, and
wherein a distance measured from said perimeter to said bottom edge is at least a full length of a forelimb of said animal as measured from said head of said animal to a foot of said animal.

11. The animal restraining shield according to claim 10, wherein a distance measured from said perimeter to said bottom edge is greater than a full length of a forelimb of said animal as measured from said head of said animal to a foot of said animal.

12. The animal restraining shield of claim 10, further comprising at least one said notch connected to an edge of said planar sheet adapted to permit ease of removal of said shield from said animal, wherein said edge is select from said top edge, said bottom edge and a vertical edge.

13. The animal restraining shield of claim 10, wherein said planar sheet comprises at least one of a semi-rigid material and a rigid material.

14. The animal restraining shield of claim 10, wherein said animal restraining shield further comprises a clinically sterile material.

15. An veterinary care product comprising:
an animal shield comprising
a planar sheet comprising a top edge and a bottom edge,
an aperture, having a perimeter, positioned adjacent said top edge, said aperture sized larger than a neck of said animal and smaller than a head of said animal adapted to prevent said animal from removing said head from said aperture, and
a plurality of notches extending from said perimeter in at least one direction,
wherein said animal restraining shield is adapted to limit a motion of one or more forelimbs of said animal, and
wherein a distance measured from said perimeter to said bottom edge is at least a full length of a forelimb of said animal as measured from said head of said animal to a foot of said animal,
said animal shield comprises sterilized materials, and
said animal shield enveloped within a sealed sterile packaging adapted to maintain the sterility of said sterilized materials.

16. The product according to claim 15, wherein said top edge width is equal to or greater than a shoulder width of said animal.

17. The product according to claim 15, wherein said vertical edge is angled toward the forelimb of said animal.

18. The product according to claim 15, wherein at least one said notch connects to an edge of said planar sheet.

19. The product according to claim 15, wherein said planar sheet comprises at least one of a semi-rigid material and a rigid material.

20. The product according to claim 15, wherein said planar sheet extends a pre-determined distance upward beyond said perimeter as measured from said head of said animal.

21. The product according to claim 15, wherein said motion further comprises at least one of a forward motion of said forelimb and a lateral motion of said forelimb.

22. The product according to claim 15, wherein said bottom edge is angled toward said forelimb of said animal.

23. The animal restraining shield according to claim 15, wherein said planar sheet further comprises a plurality of notches extending from said perimeter in at least one direction from a center of said aperture.

24. The product according to claim 15, wherein said planar sheet comprises at least one of a semi-rigid material and a rigid material.

25. The product according to claim 15, wherein said top edge width is equal to or greater than a shoulder width of said animal.

26. The product according to claim 15, wherein said animal restraining shield further comprises a clinically sterile material.

* * * * *